United States Patent
Lee et al.

(10) Patent No.: US 10,770,797 B2
(45) Date of Patent: Sep. 8, 2020

(54) ANTENNA ELEMENT

(71) Applicant: ASUSTeK COMPUTER INC., Taipei (TW)

(72) Inventors: Cheng-Tse Lee, Taipei (TW); Saou-Wen Su, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 192 days.

(21) Appl. No.: 15/950,309

(22) Filed: Apr. 11, 2018

(65) Prior Publication Data
US 2018/0301789 A1 Oct. 18, 2018

(30) Foreign Application Priority Data
Apr. 18, 2017 (TW) .............................. 106112998 A (51) Int. Cl.
*H01Q 1/24* (2006.01)
*H01Q 13/10* (2006.01)
(Continued)

(52) U.S. Cl.
CPC ........... *H01Q 13/10* (2013.01); *H01Q 1/2266* (2013.01); *H01Q 1/243* (2013.01); *H01Q 5/307* (2015.01);
(Continued)

(58) Field of Classification Search
CPC ...... H01Q 13/10; H01Q 13/103; H01Q 13/16; H01Q 13/106
See application file for complete search history.

(56) References Cited

U.S. PATENT DOCUMENTS 6,864,848 B2 * 3/2005 Sievenpiper ............. H01Q 9/14
343/767
7,129,902 B2 * 10/2006 Bancroft ................ H01Q 13/10
343/767
(Continued)

FOREIGN PATENT DOCUMENTS

| CN | 103700936 A | 4/2014 |
| CN | 105098369 A | 11/2015 |
| TW | M336547 U | 7/2008 |

OTHER PUBLICATIONS

Office Action issued in corresponding Taiwan patent application dated Apr. 18, 2018.

*Primary Examiner* — Ab Salam Alkassim, Jr.
(74) *Attorney, Agent, or Firm* — McClure, Qualey & Rodack, LLP (57) ABSTRACT

The disclosure provides an antenna element. The antenna element comprises a metal substrate, a first closed slot, a feed part and a first matching part. The first closed slot is formed in the metal substrate, and comprises a first slot section and a second slot section, wherein the length of the first slot section is greater than the length of the second slot section. The feed part spans across the closed slot, the closed slot is divided into the first slot section and the second slot section by the feed part, the feed part is used for exciting the first slot section to generate a resonant mode in a first frequency band and generate a resonant mode in a second frequency band, and exciting the second slot section to generate a resonant mode in a third frequency band. The first matching part is formed on the first slot section, and is connected to parts of the metal substrate, which are positioned on two sides of the first slot section.

4 Claims, 8 Drawing Sheets

(51) Int. Cl.
*H01Q 1/22* (2006.01)
*H01Q 5/335* (2015.01)
*H01Q 5/307* (2015.01)
*H01Q 5/321* (2015.01)
*H01Q 13/16* (2006.01)
H01Q 21/06 (2006.01)
H04M 1/02 (2006.01)

(52) U.S. Cl.
CPC ............. *H01Q 5/321* (2015.01); *H01Q 5/335* (2015.01); *H01Q 13/16* (2013.01); *H01Q 21/064* (2013.01); *H04M 1/026* (2013.01)

(56) References Cited

U.S. PATENT DOCUMENTS

| | | | |
|---|---|---|---|
| 7,348,928 B2* | 3/2008 | Ma | H01Q 13/103 |
| | | | 343/767 |
| 8,223,083 B2 | 7/2012 | Wong et al. | |
| 8,269,675 B2* | 9/2012 | Kough | H01Q 1/2266 |
| | | | 343/702 |
| 9,105,984 B2* | 8/2015 | Chang | H01Q 5/321 |
| 9,196,966 B1 | 11/2015 | Obeidat | |
| 2002/0175879 A1* | 11/2002 | Sabet | H01Q 1/36 |
| | | | 343/895 |
| 2006/0097941 A1* | 5/2006 | Bettner | H01Q 23/00 |
| | | | 343/767 |
| 2009/0256757 A1* | 10/2009 | Chiang | H01Q 1/2266 |
| | | | 343/702 |
| 2010/0085262 A1* | 4/2010 | Wolf | H01Q 3/24 |
| | | | 343/768 |
| 2012/0169552 A1* | 7/2012 | Lee | H01Q 9/285 |
| | | | 343/727 |
| 2012/0313834 A1* | 12/2012 | Eom | H01Q 1/243 |
| | | | 343/787 |
| 2014/0071009 A1* | 3/2014 | Cheng | H01Q 13/10 |
| | | | 343/770 |
| 2014/0184459 A1* | 7/2014 | Wang | H01Q 13/085 |
| | | | 343/767 |
| 2014/0240177 A1* | 8/2014 | Wang | H01Q 1/2266 |
| | | | 343/702 |
| 2014/0292583 A1* | 10/2014 | Hsu | H01Q 5/35 |
| | | | 343/700 MS |
| 2014/0315509 A1* | 10/2014 | Chang | H01Q 5/321 |
| | | | 455/307 |
| 2014/0361943 A1* | 12/2014 | Chang | H01Q 13/10 |
| | | | 343/767 |
| 2015/0229026 A1* | 8/2015 | Lindmark | H01Q 21/064 |
| | | | 343/770 |
| 2017/0207544 A1* | 7/2017 | Lee | H01Q 13/103 |
| 2017/0222326 A1* | 8/2017 | Wight | H01Q 13/16 |
| 2018/0375208 A1* | 12/2018 | Lee | H01Q 5/314 |

* cited by examiner

ANTENNA ELEMENT

CROSS-REFERENCE TO RELATED APPLICATION

This application claims the priority benefit of TW application serial No. 106112998, filed on Apr. 18, 2017. The entirety of the above-mentioned patent applications are hereby incorporated by references herein and made a part of specification.

BACKGROUND

Technical Field

The disclosure relates to an antenna element, in particular to a slot antenna element.

Related Art

Most of antennas which are applied to mobile devices including a laptop, a tablet personal computer or a mobile phone and the like are built-in antennas such as a dipole antenna, a planar inverted-F antenna (PIFA) or a loop antenna, and moreover, a specific space for an antenna requires to be reserved in the internal space of a device.

However, along with increasing of requirements on characteristics including lightness, thinness, convenience in carrying and the like of a mobile device and meanwhile in order to pursue high attractiveness and quality of a product on industrial design, metal or a material with conductivity is usually used for the appearance design of the mobile device, the radiation characteristic of an antenna is always obviously reduced due to insufficiency of space or clearance zone, the thickness of the device may be increased if the clearance zone is enough, and the design of the antenna faces the challenge of a severe environment along with increasing of the requirements.

SUMMARY

According to a first aspect, an antenna element is provided. The antenna element comprises a metal substrate, a first closed slot, a feed part and a first matching part. The first closed slot is formed in the metal substrate and comprising a first slot section and a second slot section. The length of the first slot section is greater than the length of the second slot section. The feed part spans across the first closed slot. The first closed slot is divided into the first slot section and the second slot section by the feed part. the feed part is used for exciting the first slot section to generate a resonant mode in a first frequency band and generate a resonant mode in a second frequency band, and exciting the second slot section to generate a resonant mode in a third frequency band; and the first matching part is formed on the first slot section and is connected to parts of the metal substrate which are positioned on two sides of the first slot section.

DETAILED DESCRIPTION

Figure 1:
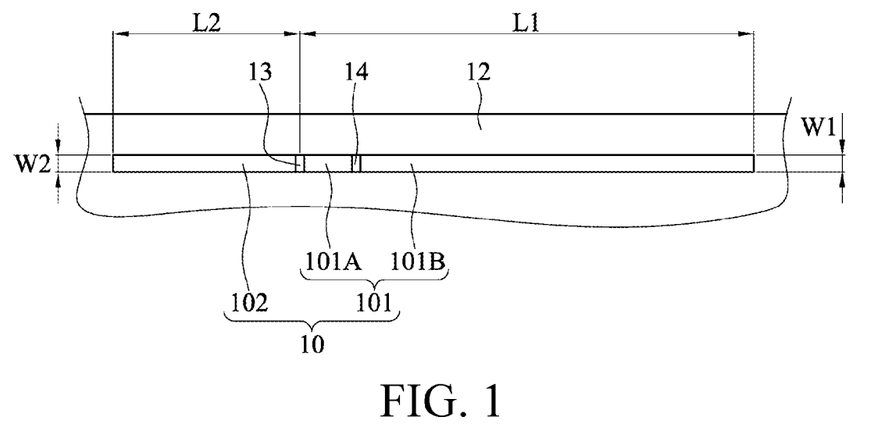
FIG. 1 is a structure diagram of an antenna element in a first embodiment according to the disclosure.

FIG. 1 is a structure diagram of an antenna element in a first embodiment according to the disclosure. Referring to FIG. 1, the antenna element comprises a metal substrate 12, a first closed slot 10, a feed part 13 and a first matching part 14. In the embodiment, the metal substrate 12 is made of a conductive material (such as steel, copper, silver, iron, aluminum or alloy thereof). The first closed slot 10 is formed in the metal substrate 12 with two closed ends. The feed part 13 is formed on the first closed slot 10, extends to span across the first closed slot 10, and is connected to parts of the metal substrate 12 which are positioned on two sides of the first closed slot 10. The first closed slot 10 is divided into a first slot section 101 and a second slot section 102 by the feed part 13 (namely, the first slot section 101 and the second slot section 102 are separately positioned on two sides of the feed part 13), the length L1 of the first slot section 101 is greater than the length L2 of the second slot section 102. Moreover, the length L1 of the first slot section 101 is not greater than 0.5 time the wavelength of a resonant mode in a first frequency band, and the length L2 of the second slot section 102 is not greater than 0.5 time the wavelength of a resonant mode in a third frequency band. When the feed part 13 transmits or receives radio frequency signals by a transmission line such as a micro-strip transmission line, a two-wire transmission line or a coaxial transmission line, the feed part 13 excites the first slot section 101 to generate the resonant mode in the first frequency band, and excites the second slot section 102 to generate the resonant mode in the third frequency band. In an embodiment, the feed part 13 also excites the first slot section 101 to generate a resonant mode in a second frequency band which is higher than the first frequency band. In an embodiment, the first frequency band is 2.4 GHz, the second frequency band and the third frequency band are 5.2 GHz and 5.8 GHz, and the second frequency band is the same as or different from the third frequency band. In the embodiment, both the second frequency band and the third frequency band are 5.2 GHz or 5.8 GHz, or the second frequency band is 5.2 GHz while the third frequency band is 5.8 GHz, or the second frequency band is 5.8 GHz while the third frequency band is 5.2 GHz.

The first matching part 14 is formed on the first slot section 101, and is connected to parts of the metal substrate 12 which are positioned on two sides of the first slot section 101, and the first slot section 101 is divided into two sections 101A and 101B by the first matching part 14. The first matching part 14 is used for optimizing the operating frequency and bandwidth of the resonant modes generated by the first slot section 101. In an embodiment, the first matching part 14 is implemented as a passive element such as a resistor, an inductor, a capacitor or any combination of the resistor, the inductor and the capacitor.

On the basis of this, the overall length of the first closed slot 10, the position of the feed part 13 in the first closed slot 10, the position of the first matching part 14 in the first slot section 101, the width W1 of the first slot section 101 and/or the width W2 of the second slot section 102 of the antenna is adjustable according to requirements of practical applications, so as to enable the resonant modes formed after the feed part 13 excites the first slot section 101 and the second slot section 102 to meet the requirements.

Figure 2:
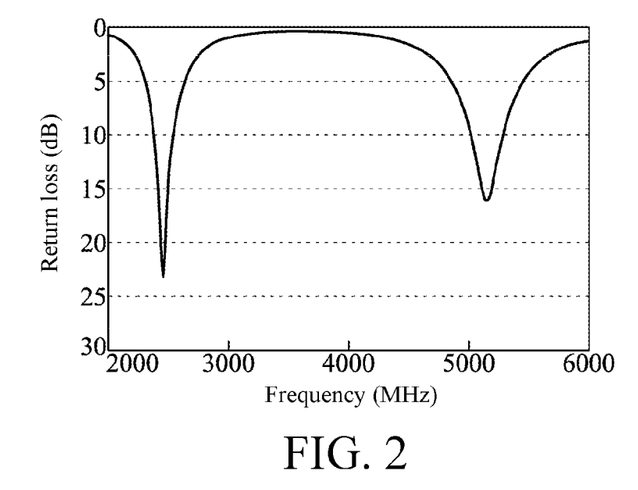
FIG. 2 is a return loss diagram of an antenna element under various operating frequencies in one of embodiments according to the disclosure.
Figure 3:
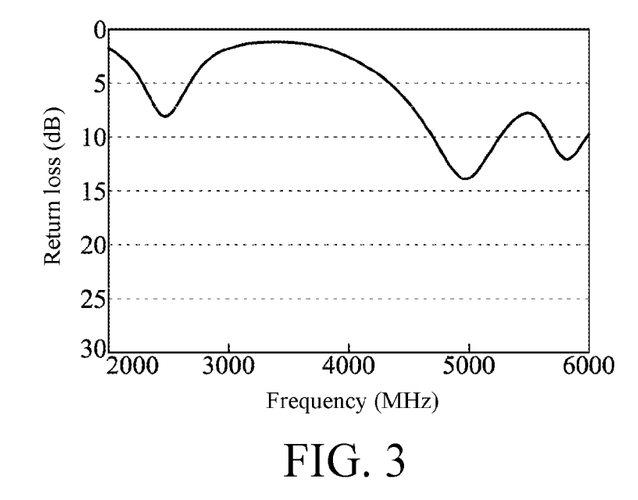
FIG. 3 is a return loss diagram of an antenna element under various operating frequencies in one of embodiments according to the disclosure.
Figure 4:
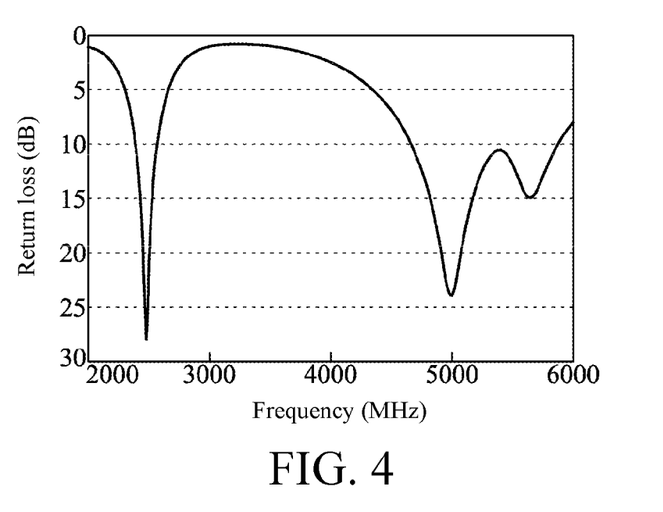
FIG. 4 is a return loss diagram of an antenna element under various operating frequencies in one of embodiments according to the disclosure.

FIG. 2, FIG. 3 and FIG. 4 are separately return loss diagrams of the antenna element under various operating frequencies in different embodiments according to the disclosure. In an embodiment, the length and width of the metal substrate 12 are 320 mm and 220 mm separately, the length L1 of the first slot section 101 is 54 mm, the length L2 of the second slot section 102 is 6 mm, the width W1 of the first slot section 101 and the width W2 of the first slot section 101 are 2 mm, the distance between the feed part 13 and the first matching part 14 is 7 mm. In an embodiment as seen from FIG. 2, the low frequency band and the high frequency band of the antenna element separately cover 2.4 GHz and 5.2 GHz, and then the antenna element is applied to a wireless local area network (Wireless LAN; WLAN). Furthermore, in an embodiment, the length and width of the metal substrate 12 are also 320 mm and 220 mm separately, when the length L2 of the second slot section 102 is increased to be 22 mm, as shown in FIG. 3, the high frequency band of the antenna element covers 5.8 GHz; and further, as shown in FIG. 4, by means of optimization of the first matching part 14, return losses of the antenna element under the operating frequencies being 2.4 GHz, 5.2 GHz and 5.8 GHz are all greater than 10 dB, and the efficiency of the antenna element is improved.

Figure 5:
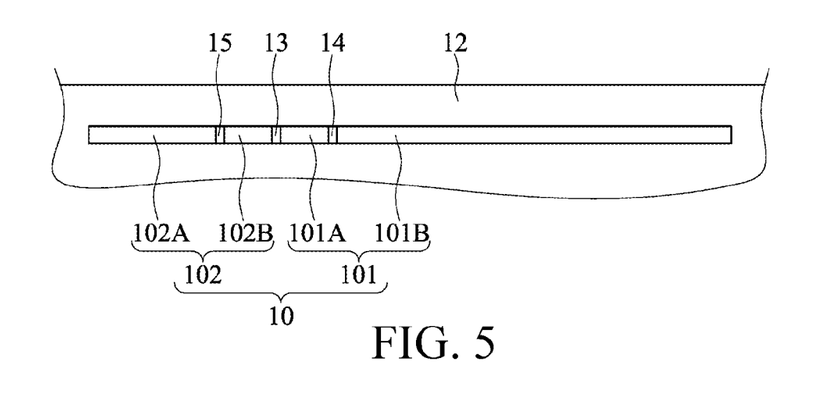
FIG. 5 is a structure diagram of an antenna element in a second embodiment according to the disclosure.

FIG. 5 is a structure diagram of the antenna element in a second embodiment according to the disclosure. In an embodiment, referring to FIG. 5, the antenna element further comprises a second matching part 15, the second matching part 15 is formed on the second slot section 102 and is connected to parts of the metal substrate 12 which are positioned on two sides of the second slot section 102, and the second slot section 102 is divided into two sections 102A and 102B by the second matching part 15. The second matching part 15 is used for adjusting the operating frequency and bandwidth of the second slot section 102. On the basis of this, the position of the second matching part 15 in the second slot section 102 is adjustable according to requirements of practical applications, so as to enable the resonant mode formed by the second slot section 102. In an embodiment, the second matching part 15 is implemented as a passive element such as a resistor, an inductor, a capacitor or any combination of the resistor, the inductor and the capacitor.

Figure 6:
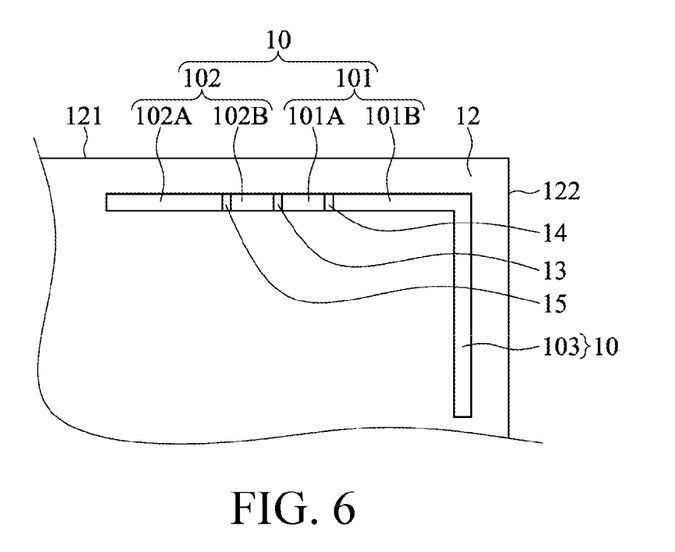
FIG. 6 is a structure diagram of an antenna element in a third embodiment according to the disclosure.

FIG. 6 is a structure diagram of the antenna element in a third embodiment according to the disclosure. Referring to FIG. 6, the first closed slot 10 further comprises an extension section 103, and the extension section 103 is connected to the end, which is away from the feed part 13, of the first slot section 101. In the embodiment, the first closed slot 10 extends along a side edge of the metal substrate 12. As shown in FIG. 6, the metal substrate 12 comprises a first side edge 121 and a second side edge 122, the second side edge 122 is next to and roughly perpendicular to the first side edge 121, the first slot section 101 and the second slot section 102 extend along the first side edge 121, and the extension section 103 extends along the second side edge 122. Therefore, the length direction of the extension section 103 is roughly perpendicular to the length direction of the first slot section 101 and the length direction of the second slot section 102.

Figure 7:
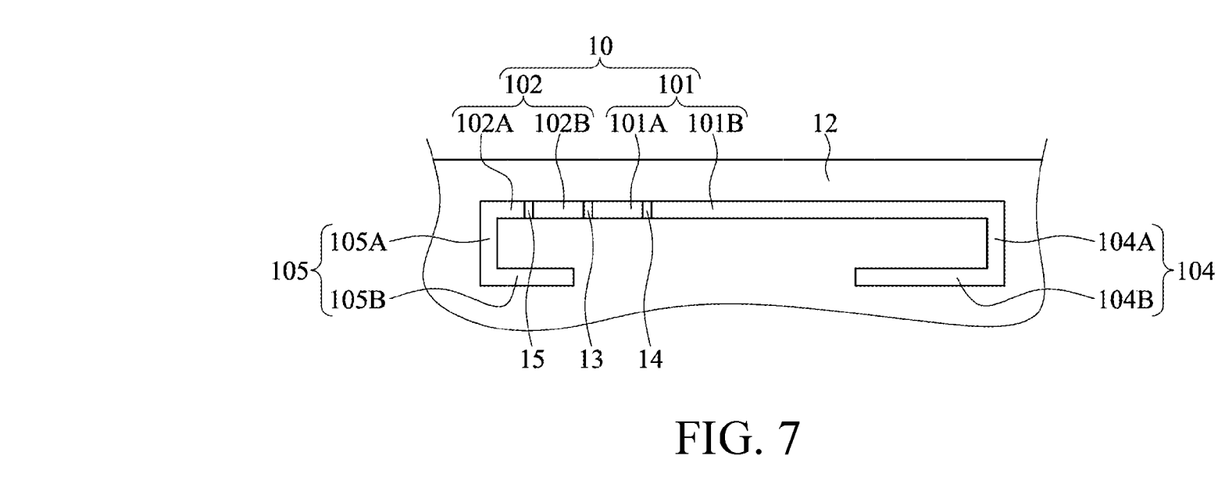
FIG. 7 is a structure diagram of an antenna element in a fourth embodiment according to the disclosure.

FIG. 7 is a structure diagram of the antenna element in a fourth embodiment according to the disclosure. Referring to FIG. 7, the first closed slot 10 further comprises two bent sections (which are separately called as a first bent section 104 and a second bent section 105 for convenience in describing). The first bent section 104 is connected to the end, which is away from the feed part 13, of the first slot section 101. The first bent section 104 further comprises a first section 104A and a second section 104B. The first section 104A is connected to the end, which is away from the feed part 13, of the first slot section 101, and the length direction of the first section 104A is roughly perpendicular to the length direction of the first slot section 101. The second section 104B is connected to the first section 104A, the second section 104B extends from the first section 104A to the feed part 13, and the length direction of the second section 104B is roughly perpendicular to the length direction of the first section 104A (namely, the length direction of the second section 104B is roughly parallel to the length direction of the first slot section 101).

The second bent section 105 is connected to the end, which is away from the feed part 13, of the second slot section 102. The second bent section 105 further comprises a first section 105A and a second section 105B. The first section 105A is connected to the end, which is away from the feed part 13, of the second slot section 102, and the length direction of the first section 105A is roughly perpendicular to the length direction of the second slot section 102. The second section 105B is connected to the first section 105A and extends from the first section 105A to the feed part 13, and the length direction of the second section 105B is roughly perpendicular to the length direction of the first section 105A (namely, the length direction of the second section 105B is roughly parallel to the length direction of the second slot section 102). Thus, the first slot section 101, the first section 104A and the second section 104B form a U-shaped portion, the second slot section 102, the first section 105A and the second section 105B form another U-shaped portion, and the size of the antenna element in the length direction thereof is reduced by the bent first closed slot 10.

Figure 8:
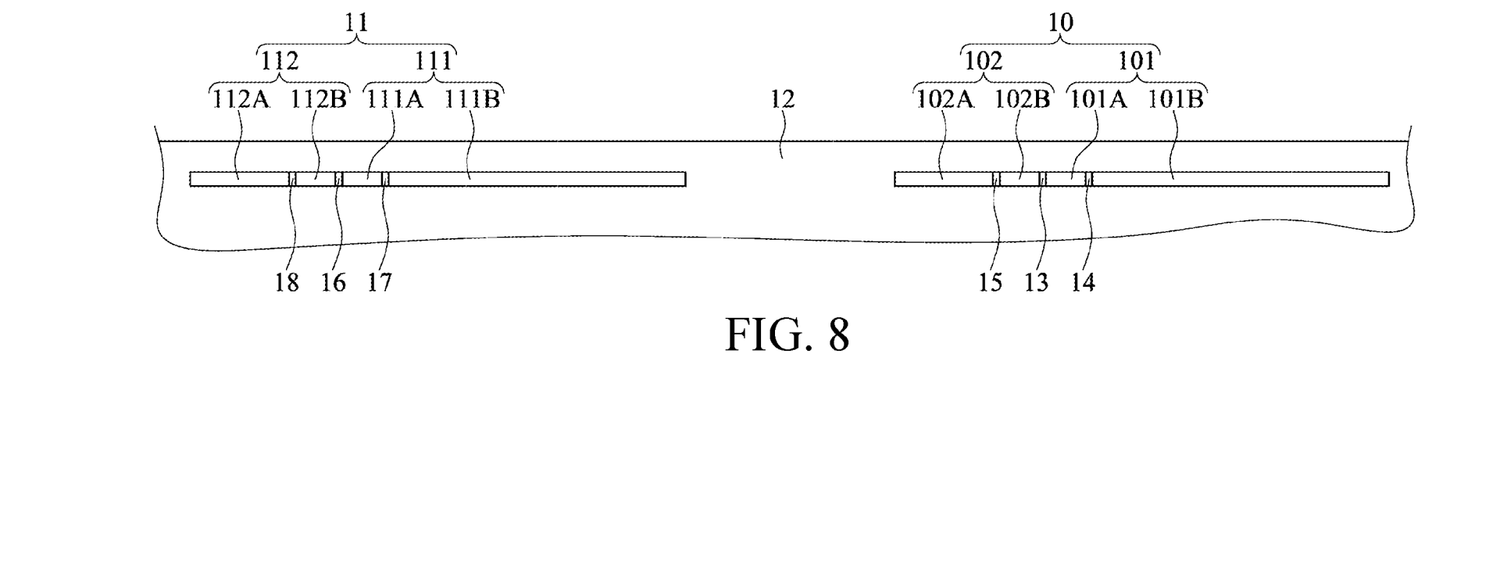
FIG. 8 is a structure diagram of an antenna element in a fifth embodiment according to the disclosure.

FIG. 8 is a structure diagram of the antenna element in a fifth embodiment according to the disclosure. Referring to FIG. 8, the antenna element further comprises a second closed slot 11. The first closed slot 10 is spaced from the second closed slot 11 by a distance, and the second closed slot 11 is not connected to the first closed slot 10. Another feed part 16 is formed in the second closed slot 11, the second closed slot 11 is divided into another first slot section 111 and another second slot section 112 by the feed part 16, and the length of the first slot section 111 is greater than the length of the second slot section 112. When the feed part 16 transmits or receives radio frequency signals, the feed part 16 excites the first slot section 111 to form a resonant mode in a fourth frequency band and a resonant mode in a fifth frequency band, and excites the second slot section 112 to form a resonant mode in a sixth frequency band. Wherein the sixth frequency band and the fifth frequency band are higher than the fourth frequency band, and the fourth frequency band, the fifth frequency band and the sixth frequency band are different from the first frequency band, the second frequency band and the third frequency band. Moreover, a third matching part 17 is formed in the first slot section 111 and is connected to parts of the metal substrate 12 which are positioned on two sides of the first slot section 111. Therefore, third matching part 17 is able to optimize the resonant modes generated by the first slot section 111. A fourth matching part 18 is formed in the second slot section 112 and is connected to parts of the metal substrate 12 which are positioned on two sides of the second slot section 112. Therefore, the fourth matching part 18 is able to optimize the resonant mode generated by the second slot section 112.

On the basis of this, by means of the resonant modes formed by the second closed slot 11, the closed slots 10 and 11 are operated in different frequency bands, in other words, the closed slots 10 and 11 separately receive or transmit signals independently without interfering each other, and the application of a multi-antenna system with multi-input multi-output (MIMO) is supported. In an embodiment, two closed slots are shown in FIG. 8, but the number of the closed slots of the disclosure is not limited herein, and is varies according to practical applications.

Figure 9:
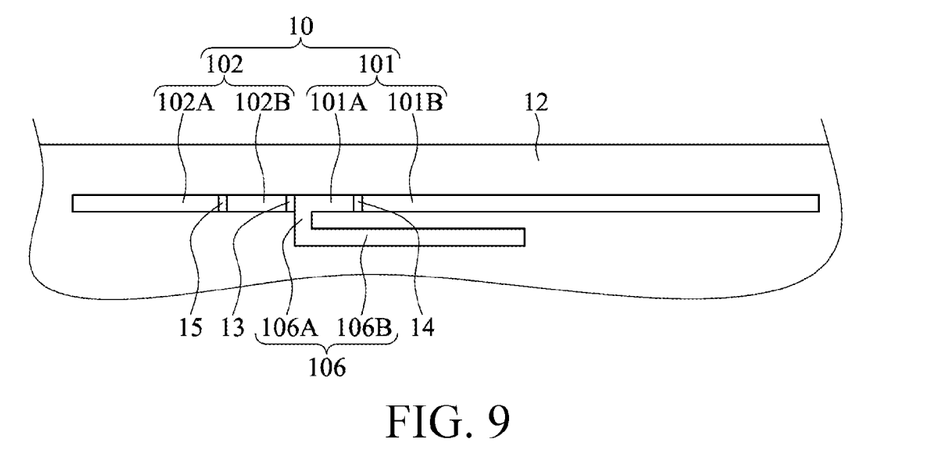
FIG. 9 is a structure diagram of an antenna element in a sixth embodiment according to the disclosure.

FIG. 9 is a structure diagram of the antenna element in a sixth embodiment according to the disclosure. Referring to FIG. 9, the first closed slot 10 further comprises a bent section 106. The bent section 106 is connected to the end, which is next to the feed part 13, of the first slot section 101. The bent section 106 further comprises a first section 106A and a second section 106B. The first section 106A is connected to the end, which is next to the feed part 13, of the first slot section 101, the joint position of the first section 106A and the first slot section 101 is located between the feed part 13 and the first matching part 14, and the length direction of the first section 106A is roughly perpendicular to the length direction of the first slot section 101. The second section 106B is connected to the first section 106A, and extends from the first section 106A to the direction away from the feed part 13, and the length direction of the second section 106B is roughly perpendicular to the length direction of the first section 106A (namely, the length direction of the second section 106B is roughly parallel to the length direction of the first slot section 101). Thus, the first slot section 101, the first section 106A and the second section 106B form a U-shaped portion. When the feed part 13 transmits or receives radio frequency signals, the bent section 106 is excited by the feed part 13 to generate a resonant mode which is different from the resonant modes that generated by the first slot section 101. And the resonant mode generated by the bent section 106 is positioned in another frequency band which is different from the first frequency band and the second frequency band, so that the number of operating frequency bands of the antenna element is increased.

Figure 10:
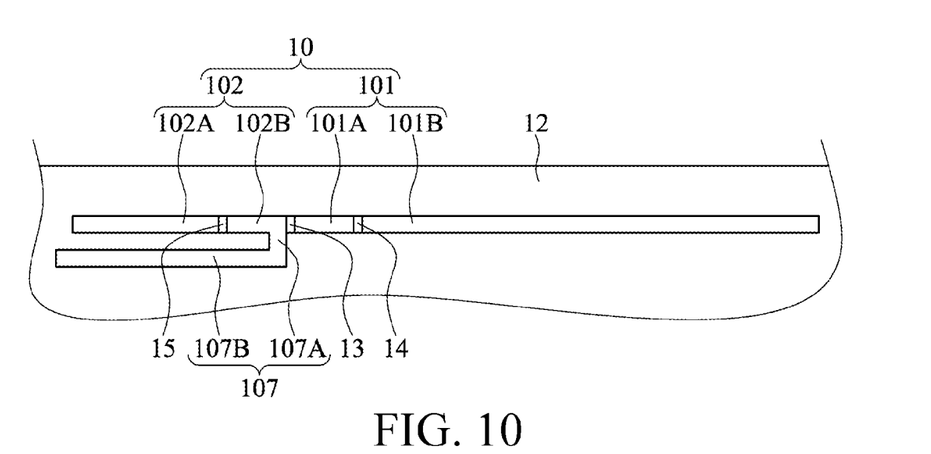
FIG. 10 is a structure diagram of an antenna element in a seventh embodiment according to the disclosure.

FIG. 10 is a structure diagram of the antenna element in a seventh embodiment according to the disclosure. Referring to FIG. 10, the first closed slot 10 further comprises a bent section 107. The bent section 107 is connected to the end, which is next to the feed part 13 of the second slot section 102. The bent section 107 further comprises a first section 107A and a second section 107B. The first section 107A is connected to the end, which is next to the feed part 13 of the second slot section 102. The joint position of the first section 107A and the second slot section 102 is located between the feed part 13 and the second matching part 15, and the length direction of the first section 107A is roughly perpendicular to the length direction of the second slot section 102. The second section 107B is connected to the first section 107A, and extends from the first section 107A to the direction away from the feed part 13, and the length direction of the second section 107B is roughly perpendicular to the length direction of the first section 107A (namely, the length direction of the second section 107B is roughly parallel to the length direction of the second slot section 102). Thus, the second slot section 102, the first section 107A and the second section 107B form a U-shaped portion, when the feed part 13 transmits or receives radio frequency signals, the bent section 107 is excited by the feed part 13 to generate a resonant mode which is different from the resonant mode generated by the second slot section 102, and the resonant mode generated by the bent section 107 is positioned in another frequency band which is different from the third frequency band, so that the number of the operating frequency bands of the antenna element is increased.

Figure 11:
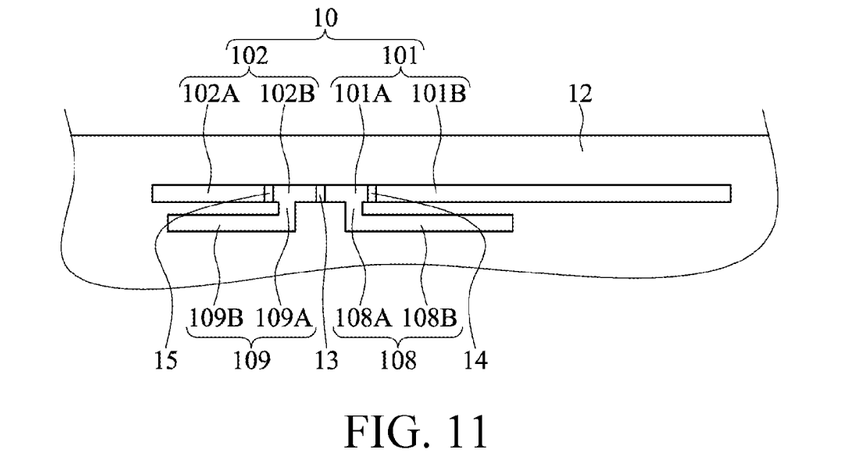
FIG. 11 is a structure diagram of an antenna element in an eighth embodiment according to the disclosure.

FIG. 11 is a structure diagram of the antenna element in an eighth embodiment according to the disclosure. Referring to FIG. 11, the first closed slot 10 simultaneously comprises two bent sections (which are separately called as a first bent section 108 and a second bent section 109 for convenience in describing). The first bent section 108 is connected to the end, which is next to the feed part 13, of the first slot section 101. The first bent section 108 further comprises a first section 108A and a second section 108B. The first section 108A is connected to the end, which is next to the feed part 13, of the first slot section 101, the joint position of the first section 108A and the first slot section 101 is located between the feed part 13 and the first matching part 14, and the length direction of the first section 108A is roughly perpendicular to the length direction of the first slot section 101. The second section 108B is connected to the first section 108A, and extends from the first section 108A to the direction away from the feed part 13, and the length direction of the second section 108B is roughly perpendicular to the length direction of the first section 108A (namely, the length direction of the second section 108B is roughly parallel to the length direction of the first slot section 101).

The second bent section 109 is connected to the end, which is next to the feed part 13, of the second slot section 102. The second bent section 109 further comprises a first section 109A and the second section 109B. The first section 109A is connected to the end, which is next to the feed part 13, of the second slot section 102, the joint position of the first section 109A and the second slot section 102 is located between the feed part 13 and the second matching part 15, and the length direction of the first section 109A is roughly perpendicular to the length direction of the second slot section 102. The second section 109B is connected to the first section 109A, and extends from the first section 109A to the direction away from the feed part 13, and the length direction of the second section 109B is roughly perpendicular to the length direction of the first section 109A (namely, the length direction of the second section 109B is roughly parallel to the length direction of the second slot section 102).

On the basis of this, the first slot section 101, the first section 108A and the second section 108B form a U-shaped portion, the second slot section 102, the first section 109A and the second section 109B form another U-shaped portion, when the feed part 13 transmits or receives radio frequency signals, both the first bent section 108 and the second bent section 109 are excited by the feed part 13 to generate resonant modes which are close to the operating frequency bands of the first slot section 101 and the second slot section 102, and thus, the operation bandwidth of the antenna element is increased; and alternatively, the first bent section 108 and the second bent section 109 are excited by the feed part 13 to generate resonant modes which are different from the operating frequency bands of the first slot section 101 and the second slot section 102, and thus, the number of the operating frequency bands of the antenna element is increased.

Figure 12:
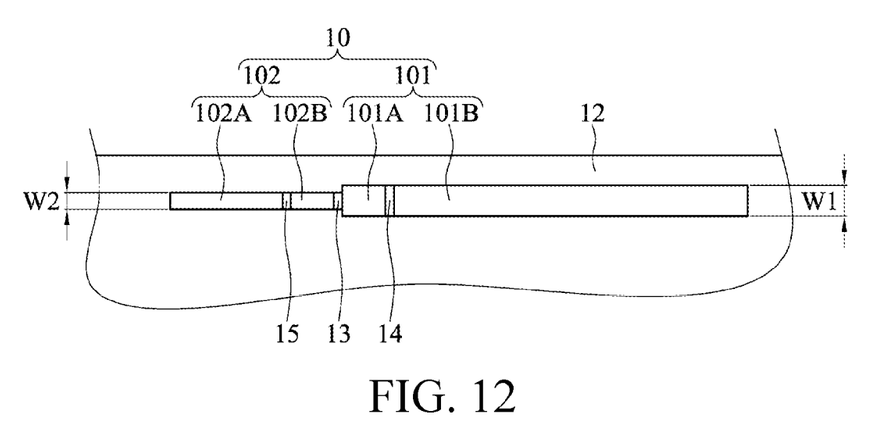
FIG. 12 is a structure diagram of an antenna element in a ninth embodiment according to the disclosure.

In an embodiment, the width W1 of the first slot section 101 is different from the width W2 of the second slot section 102. FIG. 12 is a structure diagram of the antenna element in a ninth embodiment according to the disclosure, and the width W1 of the first slot section 101 is greater than the width W2 of the second slot section 102 in which the feed part 13 is located. Thus, the resonant modes which are generated by the first slot section 101 are changed along with the increasing of the width W1 of the first slot section 101, and then the operation bandwidth of the antenna element is increased. In an embodiment, the width W2 of the second slot section 102 is greater than the width W1 of the first slot section 101, so as to increase the operation bandwidth of the antenna element.

Figure 13:
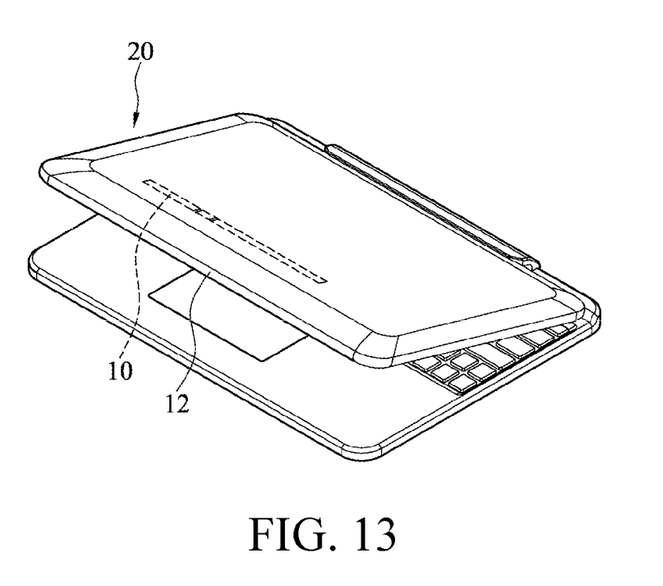
FIG. 13 is a schematic diagram of an antenna element applied to an electronic device in one of embodiments according to the disclosure.

FIG. 13 is a schematic diagram of the antenna element applied to an electronic device 20 in an embodiment according to the disclosure. In an embodiment, the electronic device 20 shown in FIG. 13 is a laptop, and the antenna element in FIG. 1 is used as an example and not limited herein. The electronic device 20 is a tablet computer, notebook computer or an all in one (AIO) computer. Moreover, the antenna element in FIG. 5 to FIG. 12 apply to the electronic device 20 in varies aspects. As shown in FIG. 13, the electronic device 20 comprises a shell formed by the metal substrate 12, and the first closed slot 10 is formed in the shell of the electronic device 20 so as to receive or transmit radio frequency signals.

To sum up, according to an embodiment of the disclosure, the antenna element is integrated in the shell, with a metal appearance, of the electronic device, the structure is simple, the electronic device does not need a clearance zone, the requirements of lightness and thinness of a mobile device are met, and meanwhile, the advantages of good heat dissipation effect, good body strength and good appearance texture of the metal shell are achieved simultaneously.

Although the disclosure has been described by way of the above embodiments, it is to be understood that the disclosure is limited thereto. Those who are skilled in the art can still make various alterations and modifications without departing from the spirit and scope of the disclosure. Therefore, the protection scope of the disclosure shall be defined by the following claims.

What is claimed is:

1. An antenna element, comprising:
a metal substrate;
a first closed slot formed in the metal substrate and comprising a first slot section, a second slot section, a first bent section and a second bent section, wherein the length of the first slot section is greater than the length of the second slot section;
a feed part configured to span across the first closed slot, divide the first closed slot into the first slot section and the second slot section, and is used for excite the first slot section to generate a resonant mode in a first frequency band and generate a resonant mode in a second frequency band, and excite the second slot section to generate a resonant mode in a third frequency band;
a first matching part formed on the first slot section and connected to parts of the metal substrate which are positioned on two sides of the first slot section; and
a second matching part formed on the second slot section and connected to parts of the metal substrate which are positioned on two sides of the second slot section;
wherein the first bent section is connected to the first slot section between the feed part and the first matching part, and the second bent section is connected to the second slot section between the feed part and the second matching part.

2. The antenna element according to claim 1, wherein the width of the first slot section is greater than the width of the second slot section.

3. The antenna element according to claim 1, wherein the width of the second slot section is greater than the width of the first slot section.

4. The antenna element according to claim 1, wherein the metal substrate is the shell of an electronic device.

* * * * *